United States Patent [19]

Lindsay, Jr. et al.

[11] 4,052,315

[45] Oct. 4, 1977

[54] ONE-PIECE MOLDED FILTER

[75] Inventors: Ernest Harold Lindsay, Jr., Joliet; Richard Francis Daubert, Jr., Bridgeview, both of Ill.

[73] Assignee: Illinois Tool Works Inc., Chicago, Ill.

[21] Appl. No.: 663,002

[22] Filed: Mar. 1, 1976

Related U.S. Application Data

[63] Continuation of Ser. No. 516,781, Oct. 21, 1974, abandoned.

[51] Int. Cl.² .............................................. B01D 29/10
[52] U.S. Cl. ................................. 210/232; 210/445; 210/463; 210/497 R; 264/DIG. 48
[58] Field of Search ............... 210/445, 448, 459, 460, 210/463, 497, 232, 323 T, 336; 264/DIG. 48

[56] References Cited

U.S. PATENT DOCUMENTS

| 417,127 | 12/1889 | Williams | 210/497 |
|---|---|---|---|
| 725,117 | 4/1903 | Morris | 210/460 |
| 791,861 | 6/1905 | Basye | 210/497 |
| 1,961,498 | 6/1934 | Kruegen | 210/447 |
| 2,081,198 | 5/1937 | Hahn | 210/497 |
| 2,354,380 | 7/1944 | Kasten | 210/443 |
| 2,640,789 | 6/1953 | Hausner | 210/499 |
| 2,658,625 | 11/1953 | Rafferty | 210/445 |
| 3,163,229 | 12/1964 | Salisbury | 210/460 |
| 3,382,984 | 5/1968 | Kuss | 210/497 |
| 3,469,706 | 9/1969 | Kissell | 210/448 |
| 3,552,552 | 1/1971 | Johnston | 210/497 |
| 3,624,779 | 11/1971 | Miller | 210/459 |
| 3,633,757 | 1/1972 | Madern | 210/497 |
| 3,746,595 | 7/1973 | Leason | 264/DIG. 48 |
| 3,827,568 | 8/1974 | Toth | 210/448 |
| 3,841,489 | 10/1974 | Combest et al. | 210/448 |
| 3,937,281 | 2/1976 | Harnsberger | 210/460 |

FOREIGN PATENT DOCUMENTS

| 724,478 | 12/1965 | Canada | 264/257 |
|---|---|---|---|

*Primary Examiner*—Wilbur L. Bascomb, Jr.
*Assistant Examiner*—Ernest G. Therkorn
*Attorney, Agent, or Firm*—Jack R. Halvorsen; Robert W. Beart

[57] ABSTRACT

The embodiment of the invention disclosed herein is directed to a one-piece molded fluid filter and a mold construction for making the same. The mold construction is provided with first and second body portions having abutting surfaces forming a parting line. A plurality of axially spaced apart semicircular recesses are formed in the body portions to provide annular recesses in the mold. The parting line of the two body portions passes across the central area of each of the annular recesses. Longitudinal channels are formed in each of the body portions to provide a flow path for the injected resin. A core member having a plurality of axially and radially outwardly directed splines is inserted between the body portions and is dimensioned so that the splines come in direct contact with the lands between the recesses of the mold body portions. A large annular recess is provided centrally of the mold body portions and enables the injected resin to flow from an inlet gate along the longitudinal channels of both body portions to completely fill the mold.

8 Claims, 7 Drawing Figures

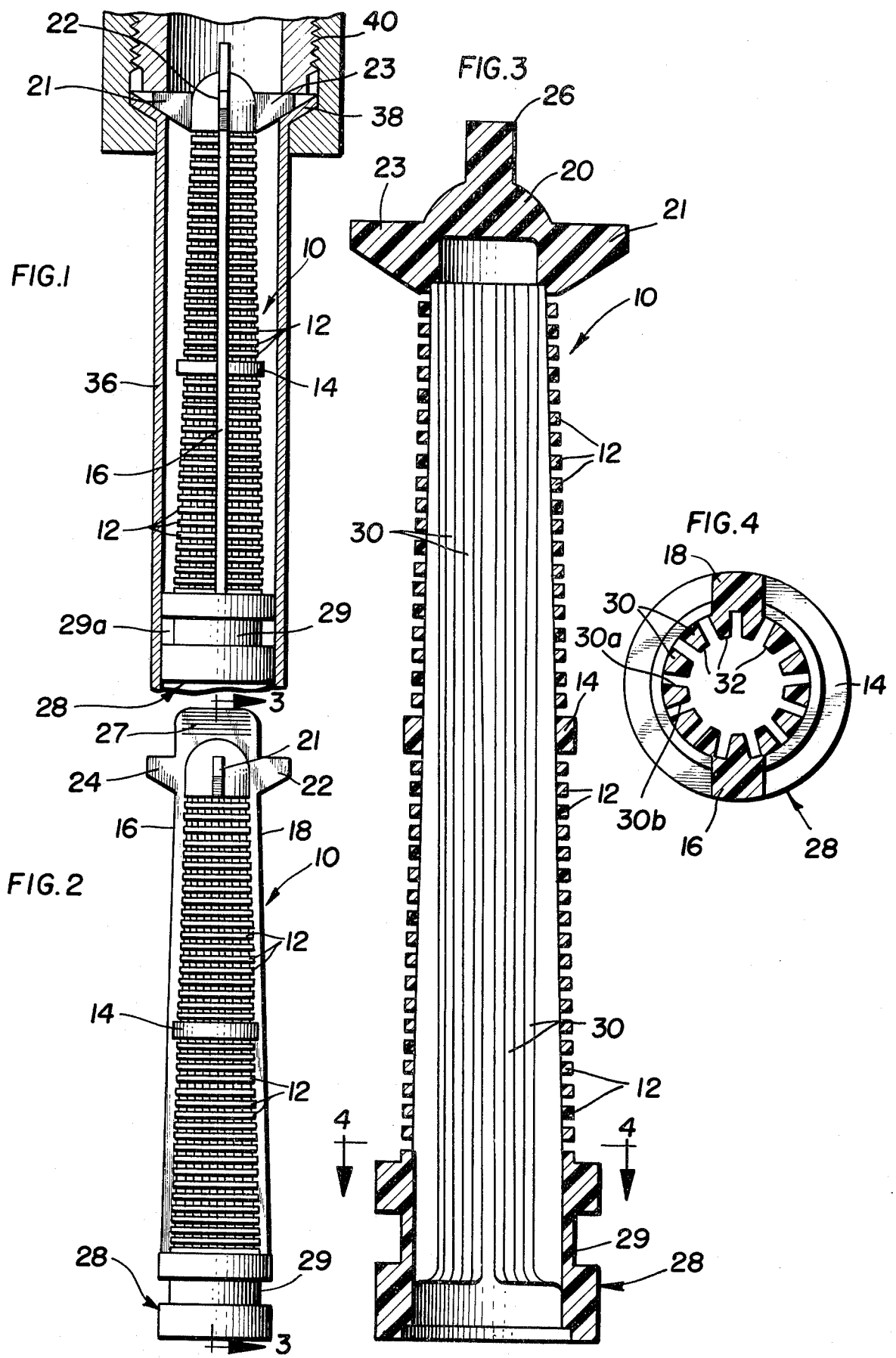

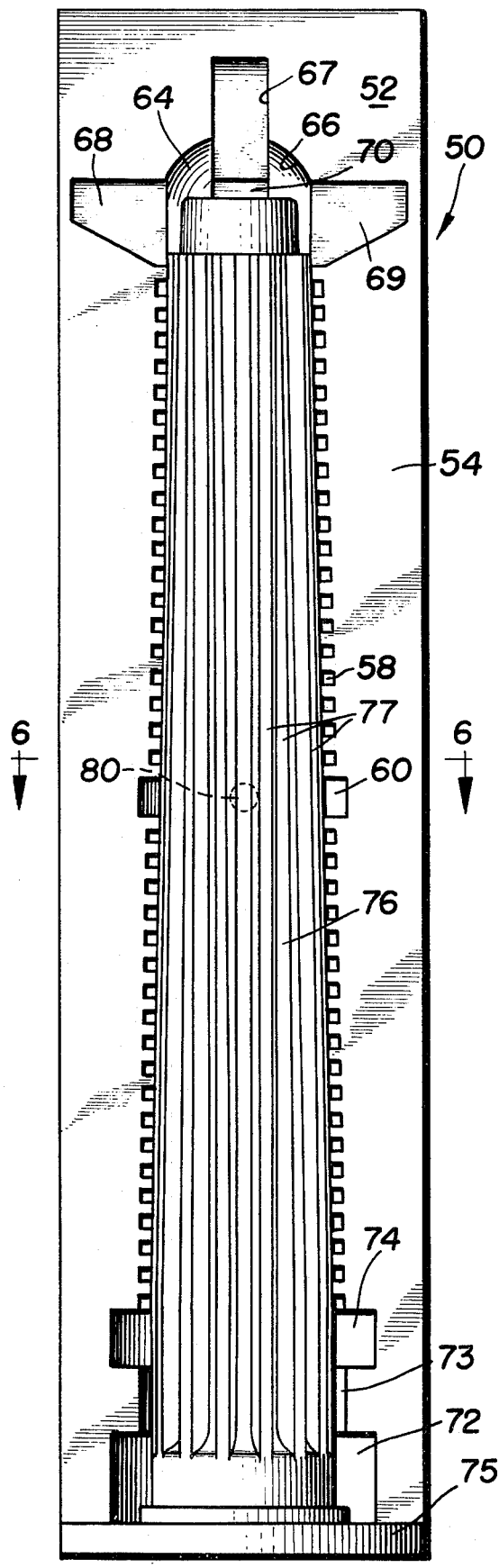
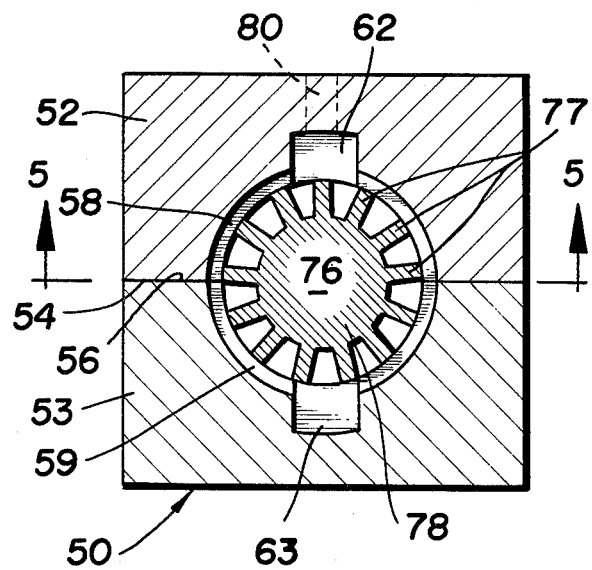
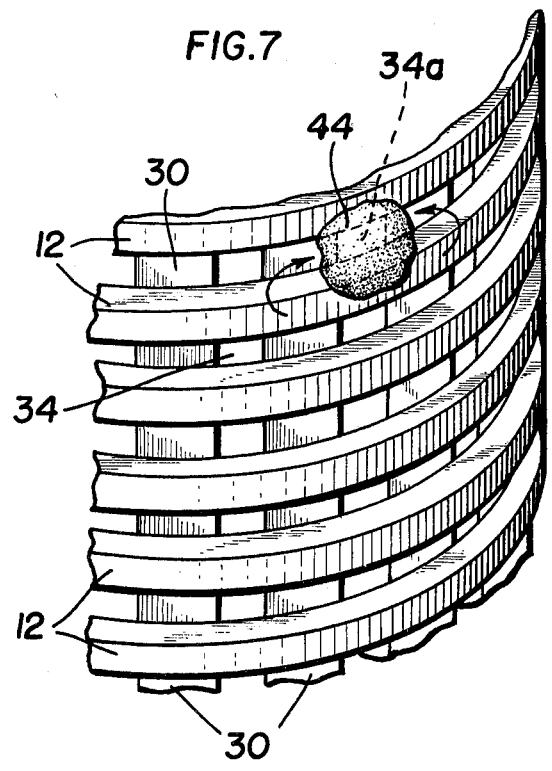

ONE-PIECE MOLDED FILTER

This is a continuation of application Ser. No. 516,781, filed Oct. 21, 1974, now abandoned.

BACKGROUND OF THE INVENTION

This invention relates generally to a one-piece molded fluid filter, and a mold structure for making the same. More particularly, the invention is directed to an injection-molded in-line fluid filter of relatively small size.

Heretofore, in-line fluid filters have been provided for the filtering of various kinds of fluid. One such use is in a hydraulic system for filtering the the hydraulic fluid as it flows through the system. One of the prior art devices used incorporates a nylon mesh which is generally planar or flat and then rolled up into a cylindrical configuration. The cylindrical nylon mesh is then inserted into an insert mold of the desired configuration and plastic reinforcing means or end fitting are formed. One of the disadvantages of the prior art filter structure is that the nylon mesh is extremely fragile and difficult to handle. Secondary molding operations are relatively expensive and lead to many problems.

Another common problem is the molding of a relatively small, intricate configuration required to form the fine mech for the filter. Many times the sections of the mold are too small to fill with resin and hence leave voids in the filter. This causes many rejects to be formed during the manufacturing operation. Furthermore, the tooling itself for forming a mold of intricate configuration is expensive and time-consuming.

Another problem with prior art filters is that they are generally formed of flat screen-like webs. Therefore particulate matter tends to clog the filter completely against fluid flow. Also, because of the configuration of the in-line fluid filters heretofore provided, turbulent fluid flow is obtained through the filter thereby increasing the in-line fluid resistance.

SUMMARY OF THE INVENTION

Accordingly, it is an object of this invention to provide a new and improved fluid filter that can be made from injection-molded material and techniques with a high degree of reliability and efficiency.

Another object of this invention is to provide a new and improved mold for forming fluid filters which enables the intricate configuration required for a filter mesh to be formed by a mold cavity and a core insert element.

Accordingly, another object of this invention is to provide a fluid filter which accumulates particulate matter in a manner which does not clog or block the openings of the filter.

Another object of this invention is to provide a fluid filter which reduces turbulent fluid flow and provides a more laminar fluid flow to decrease the in-line fluid resistance.

Briefly, the mold construction of this invention includes first and second body portions having a plurality of spaced apart annular rings formed therein. A core member is inserted into the mold and has a plurality of long, narrow grooves formed therein. These grooves are arranged to be parallel to the center line of the core so that they are at right angles to the plurality of annular grooves formed in the mold body. The grooves form a plurality of axially and radially outwardly directed splines which come in contact with the land portions between the annular grooves of the mold body. The multitude of contact points between the splines of the core and the land portions of the mold body form a multitude of small holes through which fluid can flow. Each of the multitude of holes formed in the filter is substantially rectangular in configuration and arranged in a criss-cross pattern throughout the filter body. One of the advantages of the mold design of this invention is that the long grooves formed in the core provide a free-flow path for the injection resin. Since the grooves are closely spaced about the circumference of the mold body, the annular rings formed in the core body are more easily filled. The longitudinal internal ribs of the filter are tapered along their length to provide uniform load-deflection characteristics for the filter. From a tooling standpoint, this tapering permits conical filters to have uniform aperture size since the conical core surface varies in circumference in the cross-section. This also provides a natural draft for the core for ejection of the formed filter therefrom.

A large annular band is provided approximately halfway along the length of the filter to enable center gating of the molding material. This large annular band acts as an artery for directing the injected resin from one side of the mold to the other and therefrom along the external ribs. The injection resin is then urged into the smaller dimensioned annular bands toward the parting line. The parting line acts as vent means for expelling air and gases from inside the mold to insure that the entire mold cavity is filled. If multiple gating of the mold is desired more annular bands can be incorporated in the mold construction. By providing a mold configuration which has the parting line passing through a central portion of the annular rings, improved venting of the mold is obtained and the injected resin can more readily flow into all of the space within the mold cavity.

Many other objects, features and advantages of this invention will be more fully realized and understood from the following detailed description when taken in conjunction with the accompanying drawings wherein like reference numerals throughout the various views of the drawings are intended to designate similar elements elements and components.

BRIEF DESCRIPTION OF THE DRAWINGS

FIG. 1 illustrates an in-line fluid filter constructed in accordance with this invention and shown in position in a fluid line which is illustrated in cross-section;

FIG. 2 is a side view of the filter of FIG. 1 turned 90° about its longitudinal axis;

FIG. 3 is an enlarged sectional view taken along line 3—3 of FIG. 2;

FIG. 4 is a sectional view taken along line 4—4 of FIG. 3;

FIG. 5 is an enlarged plan view of one mold body portion and has the core shown in position to construct the fluid filter of this invention;

FIG. 6 is a sectional view taken along line 6—6 of FIG. 5; and

FIG. 7 is an enlarged fragmentary perspective view of the outer peripheral wall of a filter constructed in accordance with this invention and illustrates the filtering action obtained from the filter element.

DETAILED DESCRIPTION OF THE ILLUSTRATED EMBODIMENTS

Referring now to FIGS. 1, 2, 3 and 4 there is seen an in-line fluid filter constructed in accordance with the principles of this invention and designated generally by reference numeral 10. The in-line fluid filter 10 comprises a plurality of small annular rings 12. The annular rings 12 are substantially uniform in the cross-section and are equally spaced apart along the longitudinal axis of the filter body. A large ring 14 is centrally located on the filter body. The outside diameter of the large ring 14 is smaller than the inside diameter of a fluid line or fitting 36 which is to receive the fluid filter 10.

Longitudinal external ribs 16 and 18 are formed on opposite sides of the filter and cooperate with the large ring 14 to provide sufficient strength and rigidity to the filter structure. The large ring 14 and longitudinal external ribs 16 and 18 are the results of a novel mold construction which enables molding resin to flow through the mold to form a uniform filter structure.

In the embodiment disclosed herein the filter 10 has a closed head portion 20 provided with a plurality of spaced apart ears 21, 22, 23 and 24 preferably located in quadrature engageable with the conduit 36 for centering and supporting the filters. However, it will be understood that the filter of this invention can be formed without the ears, if desired. A tab 26 extends from the head 20 and has a plurality of serrations 27, formed thereon, as best seen in FIG. 2. These serrations facilitate gripping of the filter with pliers, or the like, for insertion and removal.

A hollow base portion 28 defining a filter outlet opening is formed at the end opposite the head 20 and preferably is of a diameter to fit snugly with the internal diameter of the fluid line or fitting receiving the fluid filter. A recess 29 in the base 28 is adapted to receive an O-ring 29a, as best seen in FIG. 1.

A plurality of longitudinally extending arcuately spaced apart internal ribs 30 are formed so as to have integral junctions with the small annular rings 12 and the large annular ring 14 and have opposite ends joining the head 20 and base 28. The inner surfaces or longitudinal edges of the internal ribs 30 fall on a uniform diameter along their entire length from the base 28 to the head 20. However, the outer margins of the ribs 30 are tapered and the small annular rings 12 fradually decrease in diameter from the base 28 to the head 20. The annular rings 12 cooperate with the longitudinal internal ribs 30 to provide rectangular openings 34, as best seen in FIG. 7. The side surfaces or 30a and 30b of the ribs converge toward the center of the filter so that the ribs have a truncated triangular cross-section as shown in FIG. 4. This structure in combination with the longitudinal taper of the ribs and the progressive resection in diameter of the uniform cross-section rings 12 provides the openings 34 with substantially the same size and shape throughout the filter structure.

In use, the in-line fluid filter 10 is intended to be inserted into a fluid-carrying passageway or chamber in a variety of installations. By way of example only, FIG. 1 shows the conduit 36 in a well-known form. The conduit 36 is provided with an annular flared end 38 to cooperate with a threaded coupling nut 40 to enable the conduit to be fastened to another conduit or connector in a fluid line. The flared end 38 provides a shoulder for engaging the ears 21–24 and supporting the filter.

In the illustrated embodiment direction of fluid flow is intended to be from the head portion 20 to the base portion 28. The fluid passes through the rectangular openings into the interior of the filter element. The plurality of ribs 30 tend to convert the turbulent flow of the fluid through the openings back into a more laminar flow.

As best seen in FIG. 7, particles to be filtered will have the tendency to bridge the small annular rings 12, as represented by the particles designated by reference numeral 44. Since the rings project radially outwardly from the junction with the inwardly projecting ribs and thus from the openings 34, fluid passing in the vicinity of the particle 44 still can go around the particle and through the immediately adjacent opening 34a. The in-line fluid filter of this invention provides effective filtering of particulate matter within the fluid while minimizing the actual blockage of the openings of the filter.

Referring now to FIGS. 5 and 6 there is seen the detailed construction of a mold body and core used for making the in-line filter described above. The mold is designated generally by reference numeral 50 and comprises first and second mold body portion 52 and 53. The mold body portions 52 and 53 have mating and abutting surfaces 54 and 56: however the fit between the surfaces is not airtight whereby a vent for air and gases is provided along the entire parting line of the mold. This vent is intersected by semicircular ring-forming recesses 58 and 59 for promoting venting of each recess and insuring filling thereof with plastic material during a molding operation.

The semicircular recesses 58 and 59 are spaced apart substantially equally along the longitudinal axis of the mold body portions 52 and 53 for providing the rings 12 as indicated above. The semicircular recesses 58 and 59 form annular recesses of substantially uniform cross-sectional area along the length of the mold body. A large recess 60 is formed in the mold body portion 52 and is in alignment with a similarly shaped large recess in the mold body portion 53. A longitudinal channel 62 is formed in the mold body 52 and extends the entire length thereof. Similarly, a longitudinal channel 63 is formed in the mold body portion 53 and extends substantially the entire length thereof. A cavity portion 64 forms the head of the mold and includes a dome-shaped endwall 66 leading into a recess 67 which forms part of the channel 62. The cavity 64 includes ear-forming recesses 68 and 69 located in the plane of the parting surface 54 and an ear-forming cavity 70 located in the back portion of the head cavity portion 64. A similarly shaped ear-forming cavity is formed in the back of the head portion of the mold body portion 53. These ear-forming cavity portions form the ears 21, 22, 23 and 24 of the filter unit 10 of FIGS. 1 and 2. However, it will be understood that the ear-forming cavities can be eliminated.

A base-forming recess 72 is formed at the bottom end of the body portion 52. A reduced diameter portion 73 leads into an enlarged diameter portion 74 thereby providing means for forming the annular groove 29 of the filter 10. The base-forming recess 72 and the annular recess 74 are preferably substantially of the same diameter and provide a snug fit for the base 28 of the filter with the conduit 36.

A core member 76 is placed between the mold body portions 52 and 53. The core member 76 has an end plate 75 which seals off the end of the mold cavity. A plurality of axially and radially outwardly directed splines 77 are formed on the core 76. The central hub portion 78 of the core member 76 is substantially of uniform diameter throughout the entire length of the core. However, the outer edges or peripheral surfaces of the splines 77 are tapered along their length, as best seen in FIG. 5. The land portions between the grooves 56 in the mold body are uniformly tapered with decreasing diameters from the bottom of the mold body to the top of the mold body. These land portions have substantially the same diameter as the outer peripheral edges of the splines 77 so that they come in contact with one another. Furthermore, the surfaces of the splines have an arcuate configuration mating with the circular land surfaces. Where the segments of the surfaces of splines 77 contact and mate with the complementary surface segments of the lands between the grooves 56, the holes 34 are formed in the filter. It is noted that each spline has opposite sides parallel to each other so as to define the aforementioned converging sides 30a and 30b on the ribs 30.

A molding resin inlet port, commonly referred to as a gate 80, is formed in the mold body portion 52 and provides means for admitting molding resin into the cavity during injection molding of the in-line fluid filter shown in FIGS. 1 and 2.

During the molding operation, molding resin is forced through the gate 80 in the region of the large annular recess 60. The molding resin flows along the longitudinal channel 62 in the mold body portion 52 and about the large annular recess 60 which acts as an artery. The resin also flows into the longitudinal channel 63 toward the head and base portions of the cavity. The molding resin flows from the longitudinal channels 62 and 63 through the semicircular recesses 58 and 59 and toward the abutting surfaces 54 and 56. As the molding resin is forced through the space of the cavity, air entrapped in the cavity is forced through the small space between the abutting surfaces 54 and 56. Therefore, a cavity of complex configuration such as that required to form the in-line fluid filter of this invention is completely filled without air gaps being formed in the finished molded part.

What has been described is a novel and efficient in-line fluid filter and mold cavity for forming the same. While a single specific embodiment of the invention has been disclosed herein, it will be understood that variations and modifications may be effected without departing from the spirit and scope of the novel concepts set forth in the following claims.

The invention claimed is as follows:

1. A one-piece injection molded plastic fluid filter including a base portion having a fluid passageway therethrough, a head portion spaced axially from said base a predetermined distance, a plurality of axially spaced apart annular rings positioned between said base portion and said head portion, each of said rings having a predetermined internal and external diameter, a plurality of arcuately spaced axially disposed ribs extending between said base and head portions and extending solely in a direction radially inwardly from an internal juncture of the radially outer edges of said ribs with the predetermined internal diameter of each of said rings, said ribs and said annular rings each projecting in radially opposite directions from said junctions and cooperating to provide a multiplicity of predetermined size filtration openings at said juncture between said spaced ribs and rings, said rings have a substantially uniform cross-section and are substantially uniformly spaced from each other and said ribs have inwardly converging side surfaces for providing said openings with a substantially uniform size and shape, and at least one axially disposed larger rib extending between said head and base portions and extending radially outwardly from said juncture, said larger rib having a greater circumferential thickness than the other said ribs integrally connecting each adjacent ring throughout the entire radial extent between said predetermined internal and external diameters for a limited portion of their circumferential extent, whereby said larger rib serves to rigidify said filter rings and serves as a conduit for the injection molded plastic to ensure completed rings.

2. A fluid filter as set forth in claim 1 wherein said plurality of axially spaced apart annular rings are of decreasing diameter from said base portion to said head portion, said plurality of ribs having the outer edges thereof tapered to correspond to the decreasing diameter of said annular rings thereby providing a fluid filter to substantially tapered configuration.

3. A fluid filter as set forth in claim 2 wherein said plurality of axially and radially inwardly directed ribs have the radially inner free edge margins thereof terminating on a uniform common radius from between said base portion and said head portion.

4. A fluid filter as set forth in claim 1 further including radially outwardly directed ear means formed at said head portion, said ear means providing a support for said filter when inserted into a fluid line.

5. A fluid filter as set forth in claim 4 further including tab means extending axially outwardly of said head portion to provide means for grasping said fluid filter for insertion and removal thereof within a fluid line.

6. A fluid filter as set forth in claim 1 wherein said base portion includes an annular groove adapted to receive an O-ring to provide a seal between the base portion and an inner wall surface of fluid line receiving said fluid filter.

7. A fluid filter as set forth in claim 1, said larger rib further including a radially outwardly projecting and axially extending portion formed along the outer edge portion of said annular rings and extending from said base portion to said head portion to provide reinforcing means for said annular rings.

8. A fluid filter as set forth in claim 1 further including a larger annular ring positioned intermediate said base portion and said head portion and intersecting said larger rib, said larger ring having a cross-section greater than the cross-section of any one of said plurality of spaced apart and outwardly directed annular rings.

* * * * *